Aug. 9, 1966 R. B. SPENCER 3,265,904
SOLID STATE SYNCHRO AND SYNCHRONIZATION MEANS
Filed July 17, 1963 9 Sheets-Sheet 1
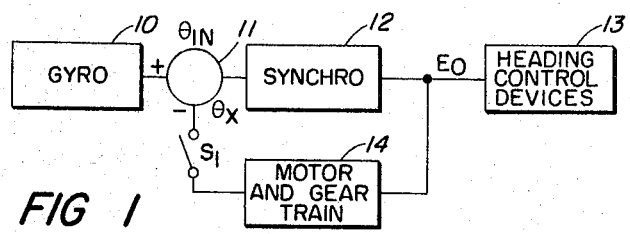
FIG 1
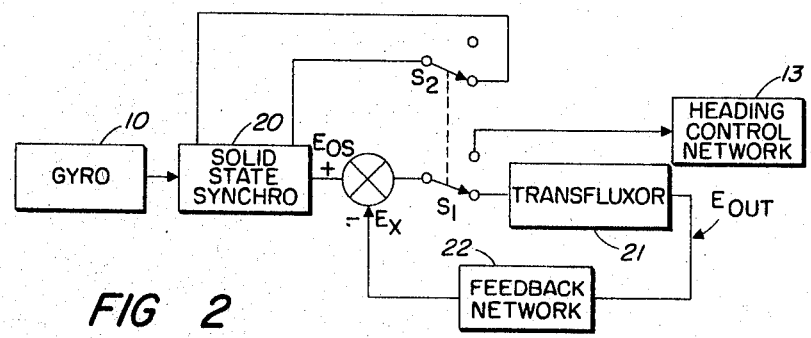
FIG 2
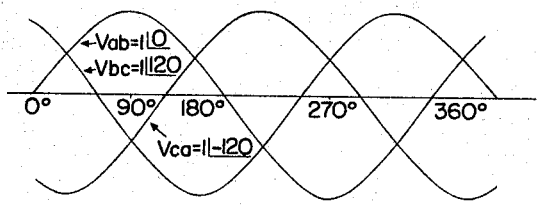
FIG 3
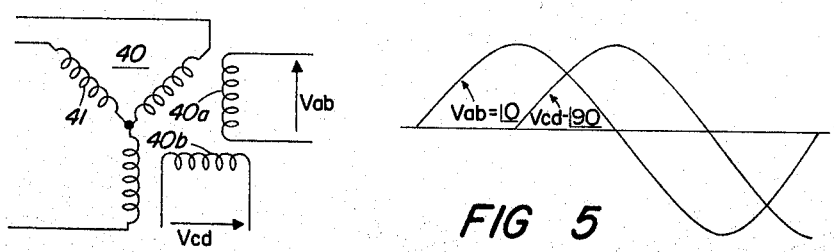
FIG 4
FIG 5
INVENTOR.
RICHARD B. SPENCER
BY
Moody & Anderson
AGENTS

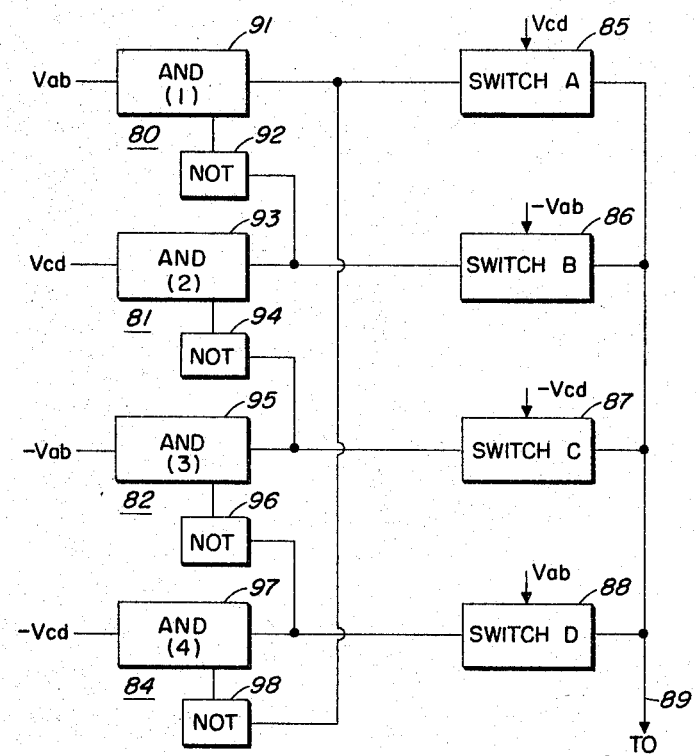
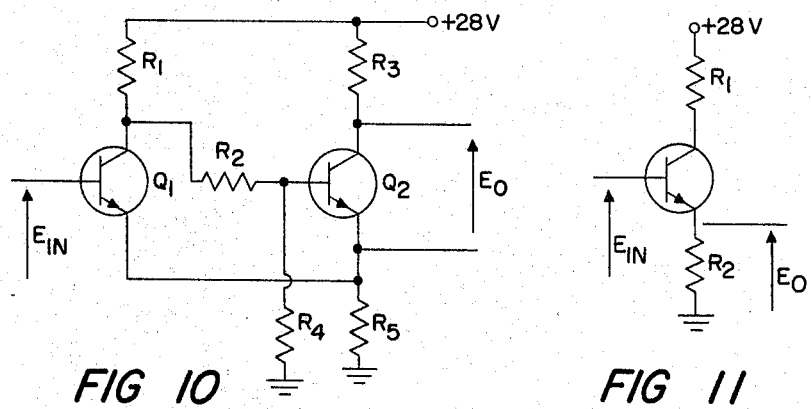
FIG 9
FIG 10   FIG 11
INVENTOR.
RICHARD B. SPENCER
BY
*Moody & Anderson*
AGENTS Aug. 9, 1966  R. B. SPENCER  3,265,904
SOLID STATE SYNCHRO AND SYNCHRONIZATION MEANS
Filed July 17, 1963  9 Sheets-Sheet 4

INVENTOR.
RICHARD B. SPENCER
BY
Moody & Anderson
AGENTS

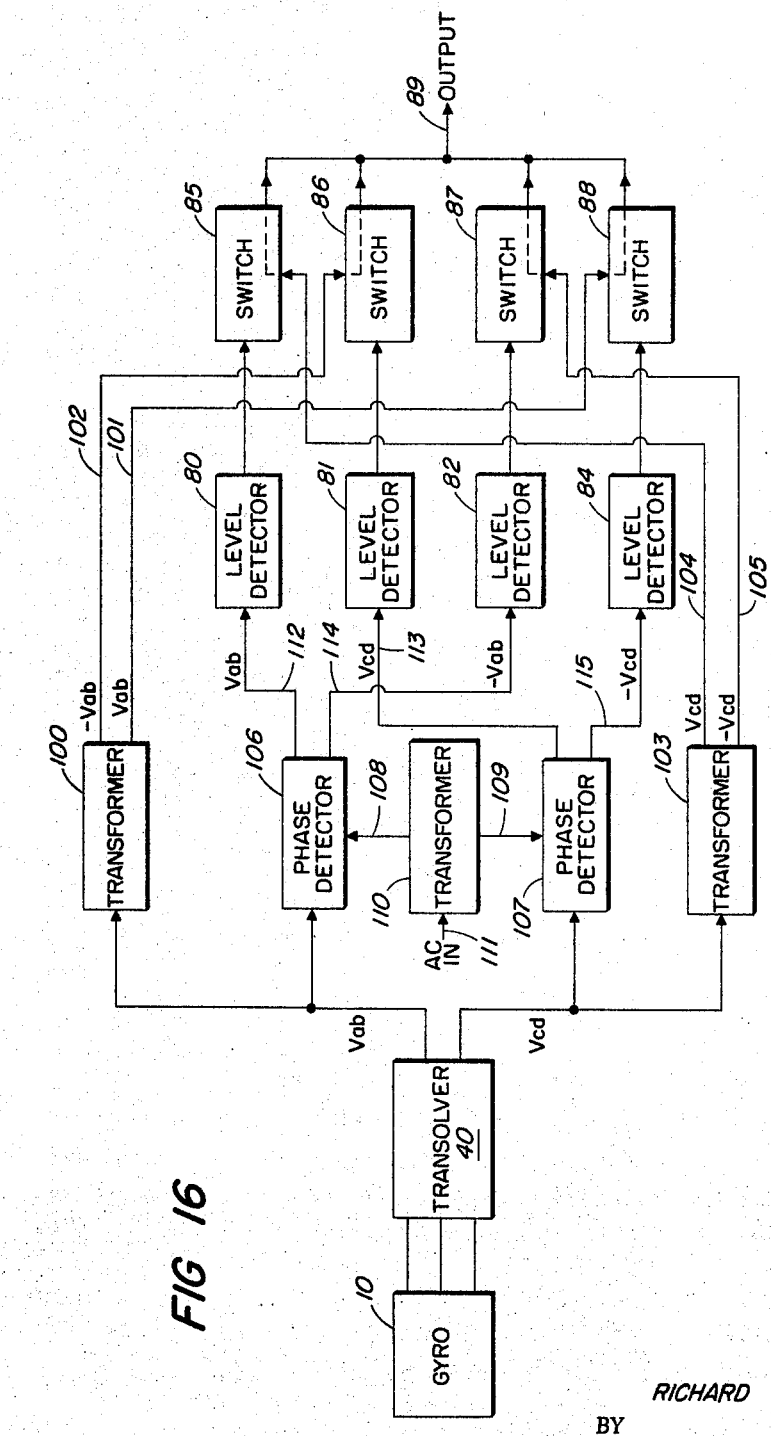

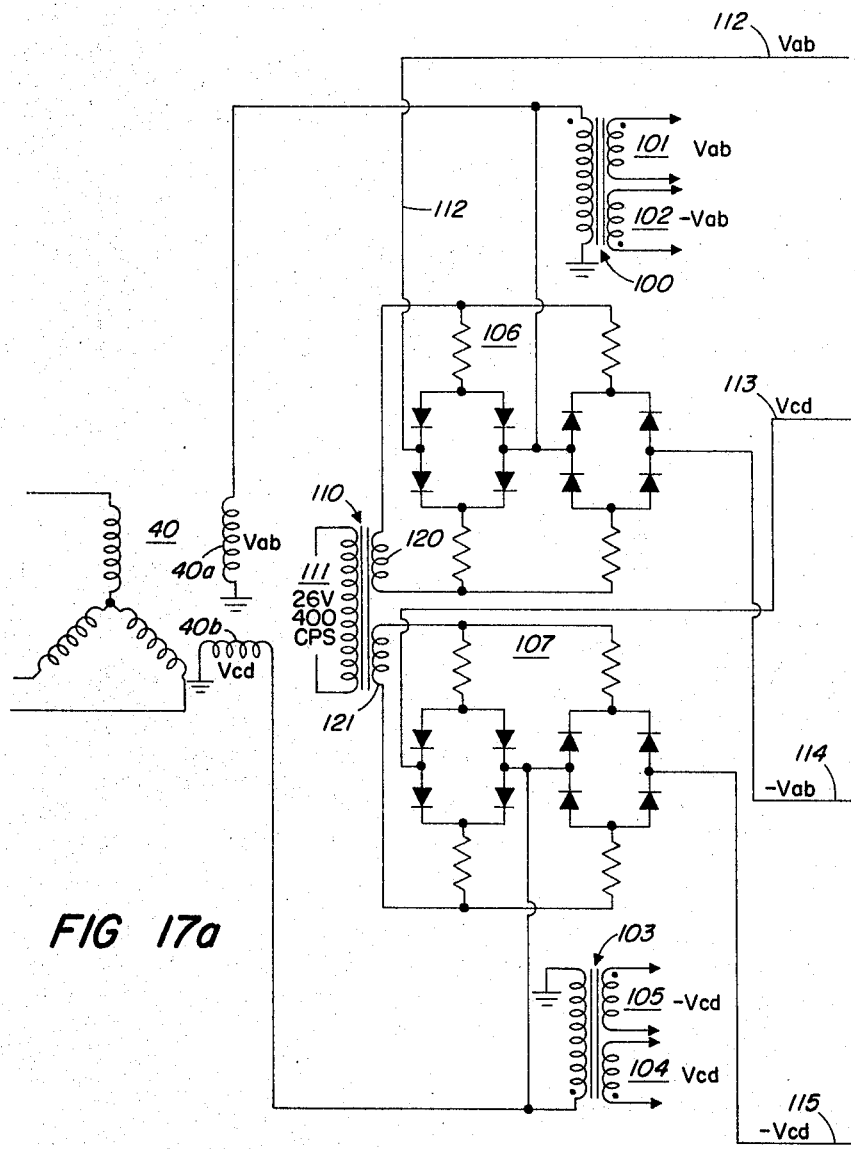
FIG 17a
| FIG 17a | FIG 17b | FIG 17c |
FIG 18
INVENTOR.
RICHARD B. SPENCER
BY
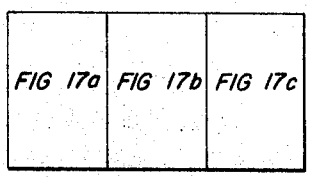
AGENTS

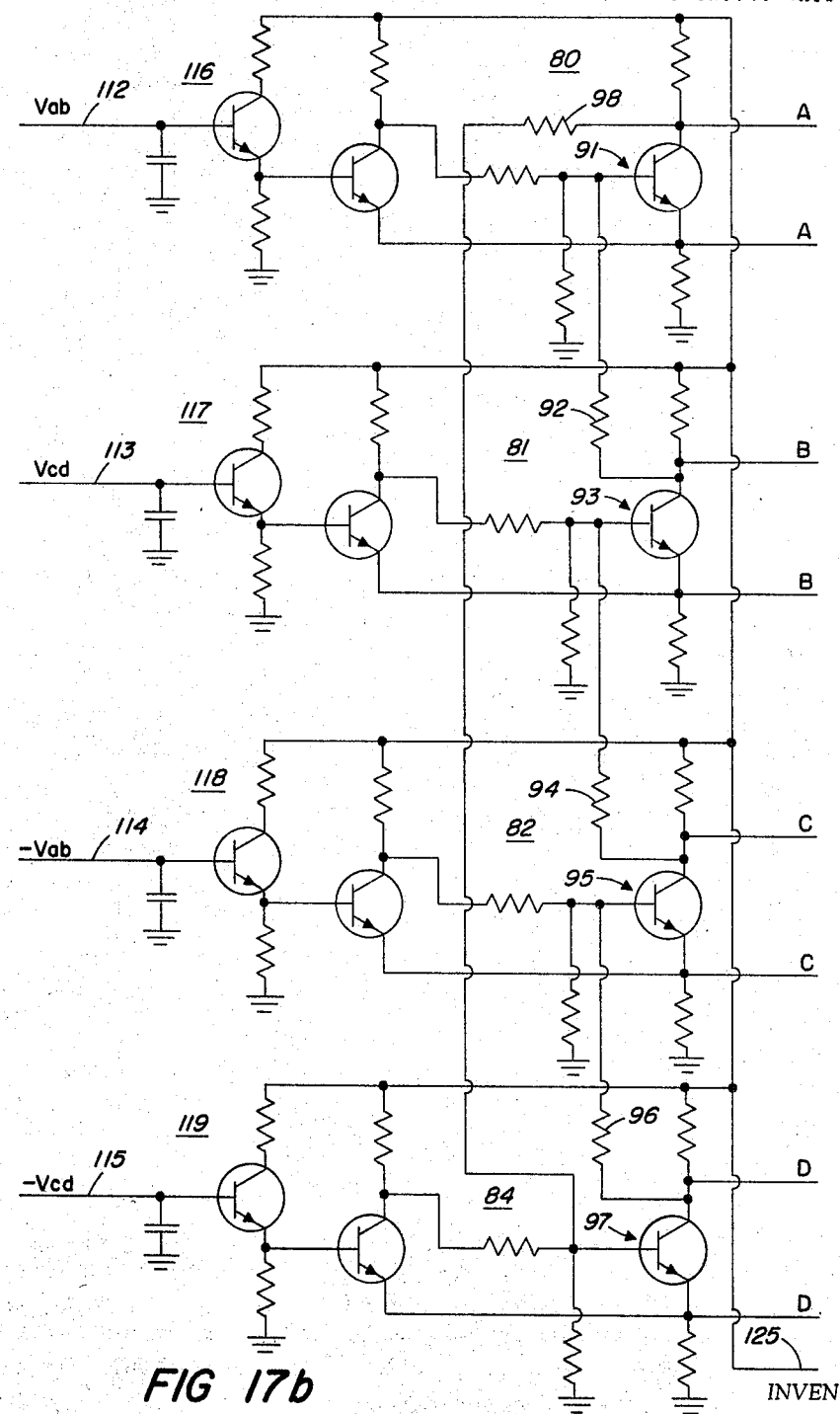

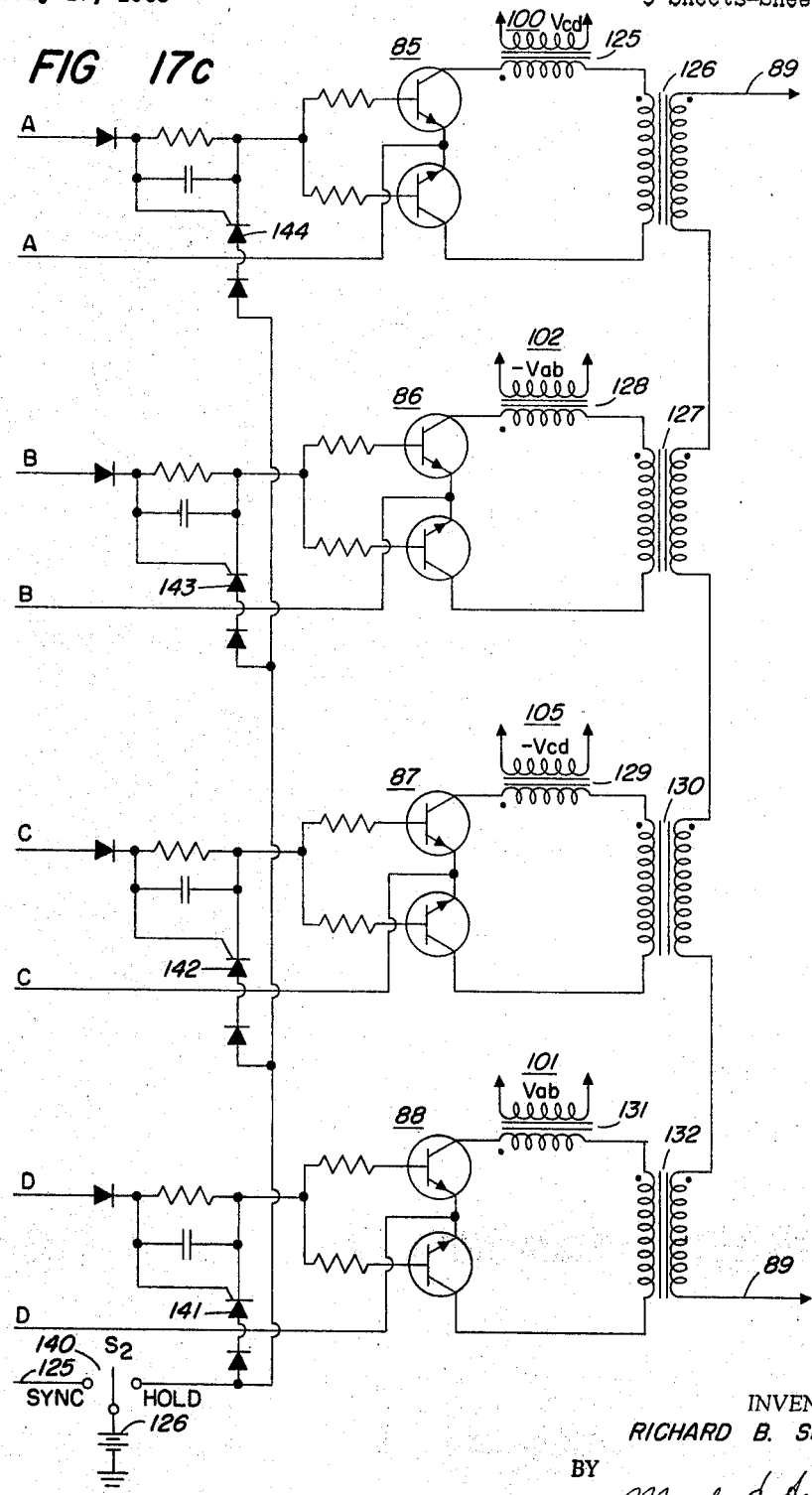

United States Patent Office
3,265,904
Patented August 9, 1966

3,265,904
SOLID STATE SYNCHRO AND SYNCHRONIZATION MEANS
Richard B. Spencer, Killeen, Tex., assignor to Collins Radio Company, Cedar Rapids, Iowa, a corporation of Iowa
Filed July 17, 1963, Ser. No. 295,775
16 Claims. (Cl. 307—88.5)

The present invention relates generally to solid state systems and more particularly to a solid state synchro in the form of passive circuitry by which three-wire angular information may be converted to two-wire information without the use of moving mechanical parts.

Present trends in the electronic art are aimed at the design of solid state circuitry to replace electromechanical devices and systems currently in use. Advantages of the so-called "solid-state" systems are self evident in that they provide increased reliability due to elimination of mechanical wear and tolerance problems inherent in motor gear trained systems, etc.; they obviate the weight and volumetric requirements which oftimes makes the use of existing electromechanical systems difficult or impossible for certain usages; and they are generally less vulnerable to failures brought on by vibration and excess heat loss.

The present invention therefore, has as a primary object thereof the provision of a completely passive or solid state system to perform the function of the synchro transmitters and receivers of electromechanical configuration which are currently employed in the art.

The present invention finds a special usage as embodied in a "heading hold" system for aircraft guidance by which the necessary tracking or synchronizing with the gyro heading information may be attained by completely solid state means and by which the presently utilized electromechanical synchros with motor and gear train may be eliminated.

The present invention is featured in the provision of a solid state synchro network by which three-wire angular information such as obtained from a gyro may be converted into two-wire information and which will provide a consistent set of information without ambiguity throughout a complete 360° range of angular information.

This invention is further featured in the provision of novel logic circuitry by which consistent output information throughout all four quadrants of angular information is assured.

These and other features and objects of the present invention will become apparent upon reading the following description in conjunction with the accompanying drawings in which:

FIGURE 1 is a block diagram showing the present state of the art means used to provide a heading-hold system in aircraft guidance devices;

FIGURE 2 is a generalized block diagram of the solid state synchro application provided by the present invention by which moving parts may be eliminated;

FIGURE 3 illustrates the normalized (demodulated) three-wire output information obtainable from a gyro source;

FIGURE 4 is a schematic representation of a transolver device as utilized in the present invention;

FIGURE 5 is a diagrammatic representation of the output wave forms obtainable from the transolver of FIGURE 4;

FIGURE 9 is a further block diagram showing a modification of the logic and switching functions of FIGURE 8;

FIGURE 10 is a schematic diagram of a bistable level detector as utilized in the present invention;

FIGURE 11 is a generalized schematic diagram of an emitter follower circuit as utilized in the present invention;

FIGURE 16 is an overall functional block diagram of a solid state synchro in accordance with the present invention, and FIGURES 17a, 17b, and 17c combine to show an overall schematic diagram of the present invention.

FIGURE 18 is a guide as to relationship of FIGURES 17a, 17b and 17c.

Figure 6:
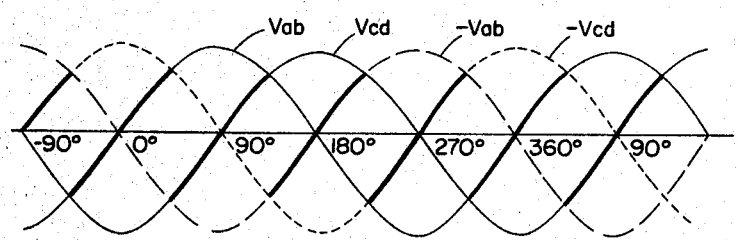
FIGURE 6 illustrates a composite diagram of four transolver output wave forms as utilized in the present invention.

The present invention may best be contemplated in terms of a particular embodiment by which electromechanical arrangements currently used in the art may be eliminated. The synchro utilized in the art is comprised of a three-winding stator in conjunction with a rotor winding by which angular information may be transmitted or alternatively may be received. A well known usage of the synchro as it exists in the art is represented functionally in FIGURE 1 as it is employed in the well known heading-hold systems for aircraft guidance. With reference to FIGURE 1, three-wire angular information from a gyro 10 is applied through a mixer 11 to a conventional synchro 12. The output of the synchro 12 $E_0$ may be applied directly to a heading control device 13 and additionally through a feedback loop comprised of motor and gear train 14 to the input of the synchro for synchronization purposes. The heading-hold flight function under consideration here is, as the name implies, a function which may be selected such that the synchro output $E_0$ commands that the aircraft maintains the heading which existed at the time of function selection. With reference to FIGURE 1, when the aircraft is flying without heading hold, a synchronization between the gyro angular information and the synchro is maintained whereby the output voltage of the synchro 12 drives motor 14 to position the rotor of the synchro 12 such that $E_0$ will always be zero:

$$(E_0 = \sin(\theta_{in} - \theta_x) = 0)$$

Under this condition the synchro is synchronized with the gyro, or might be considered to be following the gyro input information. Thus, no heading control signals are being sent to the heading control device 13. Now, should heading-hold be desired, the switch $S_1$ is opened and the shaft of the synchro 12 remains at the angular position $\theta_x$. The output from synchro 12 then becomes $$\sin(\theta_{in} - \theta_x)$$

which will be finite, since $\theta_{in}$ is no longer equal to $\theta_x$ and the aircraft is maintained on the constant heading.

The present invention provides a completely passive device which will perform the above described function including the functions of synchro 12, the motor and gear train 14 and other miscellaneous mechanical parts.

In accordance with the present invention a configuration such as illustrated in FIGURE 2 may be provided which is comprised completely of solid state and magnetic components.

With reference to FIGURE 2, a solid state synchro 20 is utilized to convert the three-wire angular information from gyro 10 to a nonambiguous two-wire information source which may be utilized by a transfluxor 21 or other synchronization memory devices capable of realizing a two-wire input of the quadrature type. Thus, a transfluxor 21 might be provided with a feedback loop 22 so that $E_{out}$ will follow $E_{os}$ as long as switch $S_1$ closes the loop. However, when switch $S_1$ is open, $E_{out}$ will remain at the value of $E_{os}$ existing at that instant and the voltage $E_{os}-E_x$ is proportional to the deviation between the input from the remembered value $E_x$. Thus, the output voltage $E_{os}-E_x$ becomes a finite voltage which may be used to drive a heading control device until $E_{os}-E_x$ equals zero.

The generalized system of FIGURE 2 may be now comprehended by a detailed consideration of circuitry performing the functions of the functionally depicted portions of FIGURE 2.

The solid state synchro 20 might first be considered in terms of the general requirements that such a device must have in order to function as a control device which is nonambiguous throughout all control quadrants. A solid state synchro must convert three-wire information as obtained from gyro 10 to some consistent two-wire information. The term "consistent" is used here to denote the requirement that the information maintain the same general control sense throughout a full 360° range of control. The three-wire gyro angular information under consideration here is the well known 120° or three phase angular information as depicted in the wave forms of FIGURE 3. Each of the wave forms in FIG. 3 depict one of the normalized or demodulated output wave forms in the form of an envelope of the angularly modulated carried as obtained from each of the three-wire permutations. As indicated in FIGURE 3, the three voltages are depicted as $V_{ab}$, $V_{bc}$ and $V_{ca}$. When considering two-wire angular information one might at first consider taking any two wires, that is, any one of the voltages $V_{ab}$, $V_{bc}$, or $V_{ac}$ and utilizing this as a two-wire angular information. No one of the three voltages, however, is a usable angular information voltage throughout all four quadrants. If one assumed that $V_{ab}$ could be so used, and in the above described heading-hold arrangement the heading were to be held at 45°, a subsequent gyro indication greater than 45°, would cause a positive output. If the gyro were turned less than 45° the output would be negative. While this provides the necessary sensing for control as concerns the first quadrant, the sensing is not held constant throughout other quadrants. For example, if the heading were held at 135°, for positive angular increases the output would be negative, and for negative angular increases the output would be positive. Thus, the sensing for control purposes is seen to be opposite between alternate quadrants. Inconsistent sets of information such as this could not drive the heading control device for the above discussed application, since the output would reverse the control function slope as control proceeded from one quadrant to the next.

For proper control it is necessary to have a device which provides the same control voltage slope in each quadrant. In accordance with the present invention, and with reference to FIGURES 4 and 5, the three-wire information such as depicted in FIGURE 3 may be applied to a transforming means 40 comprised of a three phase primary winding 41 and 90° displaced secondary windings 42 and 43 to convert the three-wire angular information to the two-wire output displaced 90° from each other. These voltages might be those as indicated in FIGURE 5 as $V_{ab}$ at zero degrees and $V_{cd}$ at —90°.

The outputs of the transforming means 40 may be connected to phase inverting transformers to provide voltages $V_{ab}$, $-V_{ab}$ and $V_{cd}$, $-V_{cd}$. This expedient provides four logic curves as illustrated in FIG. 6. FIGURE 6 depicts $V_{ab}$ with reference angle of zero degrees followed by $V_{cd}$, $-V_{ab}$ and $-V_{cd}$, each lagging by 90° the phase of the preceding wave form.

Observing the wave forms of FIGURE 6, one could always have a unified output throughout all quadrants if operation were chosen on wave form $V_{ab}$ between —45° and +45°, on $V_{cd}$ between 45° and 135°, on $-V_{ab}$ between 135° and 225°, and on $V_{cd}$ between 225 and —45°. These defined portions of the four wave forms of FIGURE 6 are indicated by the heavy lined portions thereof and it is apparent that each of these portions has a positive slope throughout.

Figure 7:
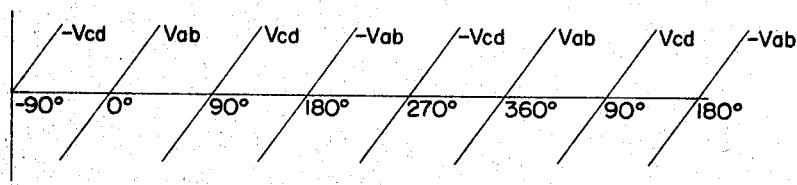
FIGURE 7 illustrates optimized operational curves utilized in the present invention.

FIGURE 7 illustrates the positive slope portions of wame form of FIGURE 6 as optimized linear slopes. The present invention operates upon these various control slopes by providing means in the form of logic switching to switch in sequence the control from one slope to the succeeding slope to insure that only one slope provides control, the one slope being the proper slope covering that portion of the operating range defined by the input information angle.

Figure 8:
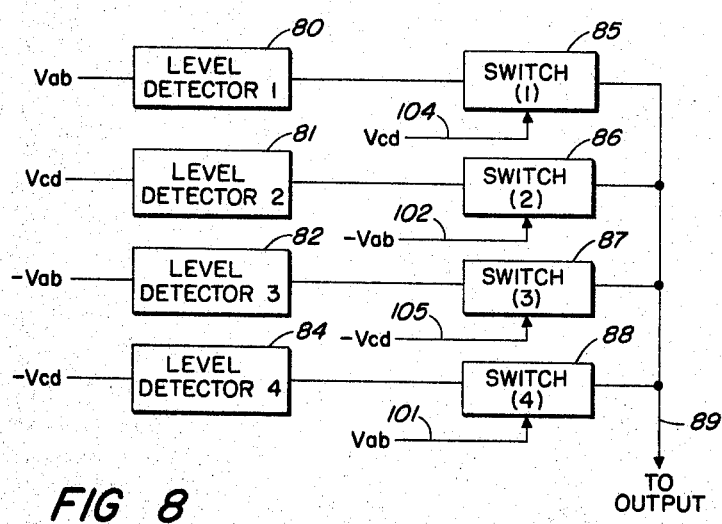
FIGURE 8 is a functional block diagram of a portion of the logic and switching system utilized in the present invention.

With reference to FIGURE 6, the four wave forms under consideration show that in each 90° interval, only one normalized curve of the four depicted rises above 0.707 (corresponding to sin 45° where the maximum voltage is unity). Thus, considering the actual wave forms of FIGURE 6 or the optimized curves of FIGURE 7, means are provided such that as soon as $V_{ab}$ rises above 0.707, the wave form $V_{cd}$ may be switched as the output control. When $V_{cd}$ rises above 0.707, $-V_{ab}$ may be switched to the output. This same procedure may be followed throughout the complete 360° of control. For each curve to be switched there exists only one curve rising above 0.707 in the switching interval. This switching system is illustrated in FIGURE 8 in functional form. The voltages under consideration are applied to level detectors 80, 81, 82, and 84, each of which provides an output when the input voltage thereto exceeds .707 and the output is utilized to activate one of the associated switches 85–88 so as to switch to the output 89 the next succeeding control voltage as depicted in FIG. 7. Thus, consider that each of the level detectors 80, 81, 82 and 84 develops a zero output voltage until their particular input reaches 0.707 of maximum input. It is apparent from operating curves of FIGURE 7 that the four input voltages reach 0.707 of their maximum voltage in sequence. Thus, considering that the signal $V_{ab}$ reaches 0.707 of maximum, level detector 80 fires to open switch 85 such that voltage $V_{cd}$ is passed to the output 89. Now, as signal $V_{cd}$ reaches 0.707 of maximum, level detector 81 fires to open switch 86 such as to apply the voltage $-V_{ab}$ to the output 89. In general operation then, each of the signals provide sequentially a positive slope operating curve and consistent portions of the four signals are sequentially switched to the output so that, in effect, the output becomes that depicted in FIG. 7, as a series of control slopes which collectively provide control throughout a full range of 360° C. From a consideration of FIGURE 8 it is apparent that one and only one switch can be opened at any one time and logic switching to be further discussed is therefore employed to insure that the proper switching sequence is realized and to obviate more than one switch being open at any given instant.

Reference to the wave forms of FIGURE 6 indicates that, for any 90° interval, two of the four wave forms are actually positive and, at 45° intervals within the quadrants, only one wave form is increasing to the 0.707 amplitude level. As discussed above, it is imperative that one and only one of the wave form signals be switched to the output 89. Because of this requirement and the inherent firing point uncertainty associated with the use of solid state circuitry in the level detector contemplated for use herein, it is possible that two of the level detectors 80–84 may be on at the same instant. For this reason in the embodiment to be described herein, a further logic modification beyond that illustrated in FIGURE 8 is incorporated to insure that only one level detector is on at any one instant and thus only one of the switches 85–88 passes its associated control signal to the output 89. This modified logic circuitry is illustrated functionally in FIGURE 9. The basic logic provided is to eliminate the possibility that two of the level detectors will be on at any given instant by providing means that make it impossible for any one of the level detectors 80, 81, 82, 84 to fire as long as the level detector preceding it in the time sequence is firing. Thus, for example, as long as level detector 80 is on, it will be impossible for level detector 84 to fire. As long as level detector 81 is on, it is impossible for level detector 80 to fire, etc. The logic may basically be described as means interconnecting the level detectors to assure that if one level detector fires, it turns off the level detector that precedes it. With reference to the block diagram of FIG. 9, each of the level detectors 80, 81, 82, and 84 is indicated as being comprised of an "and" switch (91, 93, 95, and 97) in conjunction with interconnecting "not" gates (92, 94, 96, and 98). The "and" switches are the actual level detectors and are identified as incorporating "and" logic, since, in order to be triggered, their input must be above 0.707 of the maximum amplitude of the input signal thereto, and the following "and" circuit must not be on. Thus, for example, if "and" switch 91 in FIGURE 9 is on, indicating that its associated input $V_{ab}$ is above 0.707, and the input $V_{cd}$ to the following "and" switch 93 should rise above 0.707, switch 93 will turn on and switch 91 will turn off. The details of the logic circuitry will be further discussed.

It would suffice at this point, to summarize the logic and switch circuitry of FIGURE 9 as being that which provides that the operating curves are connected in proper time sequence to the output 89 and includes means to assure that only such output may be switched at any one time. The relative phasing between the input voltages $V_{ab}$, $V_{cd}$, $-V_{ab}$, and $-V_{cd}$ is such as to assure that the operating curves as indicated in FIGURE 7 are applied in proper sequence.

It should here be emphasized that the three-wire input signal may be converted to a plurality of phase displaced signals other than the four signal embodiment described and illustrated herein. For example, each of the input signals from the gyro, as depicted in FIGURE 3, might be phase reversed to provide six signals mutually 60° out of phase. In this case, means might be employed to produce corresponding envelope signals for monitoring in six level detectors, each adapted to provide an output when the amplitude of the signal input thereto exceeds 0.5 of its maximum value. Six switches might then be employed in conjunction with the common output line to switch 60° like-segments of each of six signals to the output with the signal segments being symmetrical about 0°, 60°, 120°, 180°, 240°, and 300°, respectively. The six segments would provide more linear operating curves than the four-segment sequences described in the illustrated embodiment.

In accordance with the present invention, the general operation principle contemplates that the input signal may be resolved into a plurality of $m$ signals each phase displaced from a preceding one by $360/m$ degrees. The level detectors would operate on a threshold defined as $\sin(180°/m)$ times the maximum amplitude of the signals, and the switched segments of the plurality of $m$ signals would be $360/m$-degree portions of the signal and be symmetrical about $n(360/m)$ degrees, where $n=0, 1, 2 \ldots (m-1)$.

Thus far the solid state synchro portion of the present invention has been described in terms of fundamental building blocks. Reference may now be made to FIGURE 16 which indicates an overall block diagram of the arrangement in accordance with the present invention which switches segments of four signals to a two-wire nonambiguous quadrature output signal in response to a three-wire angular information input signal. For this embodiment $m=4$ and thus the level detector threshold is to be determined by $\sin 180°/4$ or 0.707 times the maximum amplitude of the monitored signal levels. The switched segment would be 360°/4 or 90° portions of the four signals, respectively symmetrical about $n(360°/4)$, where $n=0, 1, 2$ and 3 or about 0°, 90°, 180°, and 270°.

FIGURE 16 indicates the gyro input as being applied to a signal transforming means 40 from which the two output signals $V_{ab}$ and $V_{cd}$ (FIGURE 5) are developed, these signals being phase displaced by 90°. Transforming means 40 might be a transolver or Scott-T type transformer. The signal $V_{ab}$ is applied to a transformer 100 which includes appropriate secondary windings so as to develop output signals $V_{ab}$ and $-V_{ab}$ which are mutually 180° out of phase. These signals are applied respectively through connectors 101 and 102 to switches 88 and 86 respectively. The $V_{cd}$ output from transforming means 40 is applied to transformer 103 so as to develop output signals $V_{cd}$ and $-V_{cd}$ which are mutually 180° out of phase. The signals $V_{cd}$ and $-V_{cd}$ are applied respectively through connectors 104 and 105 to switches 85 and 87. Thus, signals from transformers 100 and 103 in the form of modulated signals with modulation envelopes corresponding to the four signals indicated in FIGURE 6 are applied to the switches 85–88 through which they are sequentially switched to the output 89.

The level detectors 80, 81, 82, 84 monitor the magnitudes of the four phase-displaced signals under consideration so as to sequentially open switches 85–88 to effectively connect lines 104, 102, 105 and 101 to the output line 89.

The level detectors monitor the envelopes of the quadrature signals which are provided by phase detecting the outputs of transforming means 40 with respect to an A.C. reference signal. Thus, the signals $V_{ab}$ and $V_{cd}$ are applied respectively to phase detectors 106 and 107. Reference inputs 108 and 109 are applied from transformer 110 which receives the A.C. reference signal 111. The outputs from the phase detectors correspond to the instantaneous levels, that is the envelopes, of signals $V_{ab}$, $V_{cd}$, $-V_{ab}$ and $-V_{cd}$. A first output from phase detector 106 is that of $V_{ab}$ applied through line 112 to level detector 80. A first output from detector 107 is the signal $V_{cd}$ applied through line 113 to level detector 81. A second output from phase detector 106 is $-V_{ab}$ applied through line 114 to level detector 82, and a second output from phase detector 107 is the signal $-V_{cd}$ applied through connector 115 to level detector 84.

The arrangement of FIGURE 16 shows the interrelationship of the functional blocks of the present invention which develop the desired sequential positive-slope operating curves from the three-wire angular information applied as input to the system. The operation of the phase detector circuitry and the level detectors and the switching will further be considered in detail with reference to schematic diagrams of embodiments which perform these functions.

Before referring to the overall schematic diagram of the solid state synchro, a consideration of the trigger and phase detecting circuitry along with the switching circuits will aid towards a comprehension of the complete system. FIGURE 10 illustrates a level detector circuit of the type employed in the present invention which performs the detecting operation described in conjunction with level detectors 80, 81, 82, and 84.

The previously described logic requires the use of a bistable level detector. The level detectors must monitor the input signal to provide an output when the signal rises above 0.707 maximum and maintains this output voltage until the input signal falls below 0.707 of maximum.

The bistable device utilized in this invention comprises a Schmitt trigger circuit as illustrated in FIGURE 10. In operation, when the input to the trigger circuit, $E_{in}$, rises above 0.707 of its maximum value, the output voltage, $E_0$ switches to its maximum value and remains there until $E_{in}$ falls below 0.707 of its maximum value. The Schmitt trigger switching device is known in the art and need not be described in detail herein.

As utilized in the present invention, the Schmitt trigger circuit receives its input from a phase detector. In the embodiment constructed, it was found that for stability reasons, isolation was needed between the phase detector and the Schmitt trigger circuit. To provide this isolation, an emitter follower circuit is placed between the phase detector and the Schmitt trigger. The emitter follower utilized is illustrated in FIGURE 11, wherein resistor $R_2$ is selected to match the input characteristics of the associated Schmitt trigger circuit. Resistor $R_1$ tends to limit the current through the emitter follower in case of excessive loading.

With reference to FIGURE 16, each of the level detector functional blocks 80, 81, 82 and 84 comprise an emitter follower as illustrated in FIGURE 11 feeding a Schmitt trigger circuit as illustrated in FIGURE 10. The inserts to the emitter followers are the outputs 112, 114, 113 and 115 from phase detectors 106 and 107 which are the detected envelopes of the quadrature voltages $V_{ab}$, $-V_{ab}$, $V_{cd}$, and $-V_{cd}$ respectively.

Figure 12:
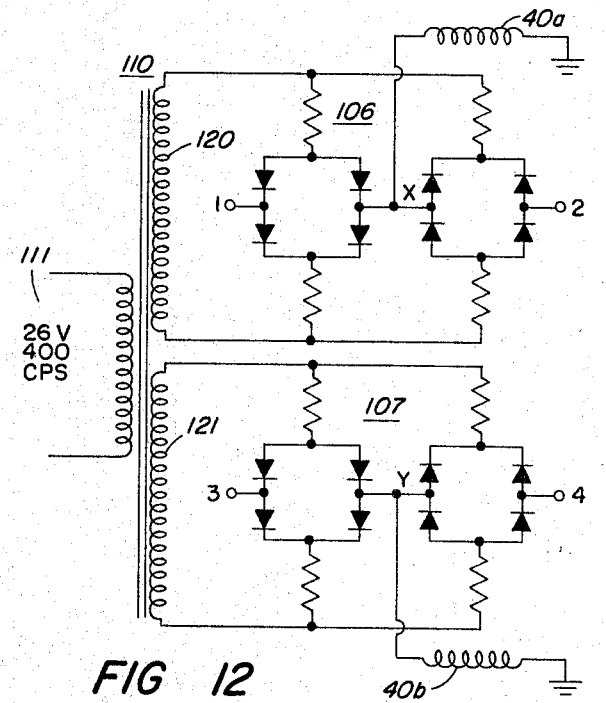
FIGURE 12 is a partial schematic diagram of the phase detecting arrangement as used in the present invention.

The phase detectors 106 and 107 of FIGURE 16 are illustrated in FIGURE 12. Each of these phase detectors is of a half wave type utilizing eight diodes as indicated in FIGURE 12. The phase detectors are fed a reference signal applied from a source 111 through input transformer 110. Detector 106 receives its reference from a first secondary winding 120 of transformer 110, while detector 107 receives its reference from secondary winding 121 at transformer 110. The signal $V_{ab}$, as developed in transolver winding 40a, is the second input to detector 106. The signal $V_{cd}$ from transolver winding 40b is applied as a second input to phase detector 107.

The outputs 1, 2, 3, and 4 indicated in FIGURE 12 are the four signals $V_{ab}$, $-V_{ab}$, $V_{cd}$ and $-V_{cd}$ as illustrated in FIGURE 6 and correspond to the demodulated envelopes of these quadrature signals.

As above described, these four signal envelopes are fed individually through an associated emitter follower to one of the Schmitt trigger circuits which act as the level detectors of the present invention.

Figure 13:
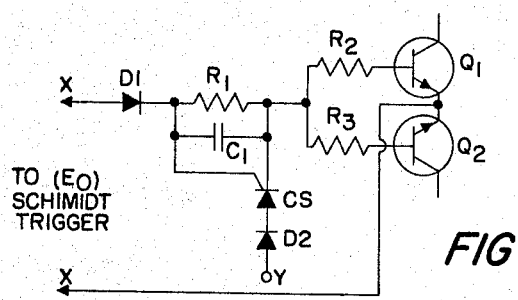
FIGURE 13 is a further schematic representation of switching circuitry utilized in the present invention.

Each of the Schmitt trigger circuits develops an output signal at the time the input voltage thereto rises to 0.707 level. This output voltage is applied to a subsequent switching and heading hold circuitry such as illustrated in FIGURE 13. With reference to FIGURE 13, the output from the Schmitt trigger level detector is connected to terminals xx. Thus, when the Schmitt trigger fires, a relatively large voltage is impressed at xx. This voltage causes sufficient base current to flow through switching transistors $Q_1$ and $Q_2$ to turn $Q_1$ and $Q_2$ on. This base current additionally passes through the gate and cathode electrodes of the control switch $C_s$, since the resistance between the gate and cathode electrodes of the control switch $C_s$ is much smaller than the series resistance $R_1$. Capacitor $C_1$ charges to the voltage drop between the gate and cathode electrodes of the control switch $C_s$. Sufficient gate current flows so that, if a 28 volt D.C. source were present at terminal y, control switch $C_s$ would conduct. Control switch $C_s$ as illustrated is comprised of a voltage controlled rectifier, which, in the presence of a positive voltage on the anode and a positive voltage on the gate electrode will conduct until the anode voltage is removed. When considering the previously discussed heading hold arrangement, it is necessary that operation remain on the control curve which existed prior to instituting the heading hold action. Accordingly, it is necessary that all the curve switching stop when the heading hold function is initiated. Therefore, to initiate a heading hold function, a 28 volt source is connected to the anodes of the control switches associated with output switches 85–88 and is simultaneously removed from the associated level detectors 80, 81, 82, and 84 so as to disable the level detectors. This operation may be performed by a simple switching arrangement in conjunction with a 28 volt source as will be further discussed.

Referring further to FIGURE 13, if the capacitor $C_1$ were charged when the 28 volt D.C. source is removed from terminal y, the capacitor $C_1$ discharges through the resistor R21 and the gate of the control switch $C_s$. When 28 volts is connected to terminal y, base current for switching transistors $Q_1$ and $Q_2$ passes through the control switch $C_s$ and holds transistors $Q_1$ and $Q_2$ on. If the Schmitt trigger level detector circuit providing the input at terminals xx had not fired, capacitor $C_1$ would not be charged so that when 28 volts were placed at terminal y, transistor $Q_1$ and $Q_2$ would receive no base current, since the control switch $C_s$ would not conduct. In the circuitry of FIGURE 13 the diode $D_1$ prevents current from feeding back into the preceding Schmitt trigger current when the control switch $C_s$ is conducting and causing other control switches to activate. Diode $D_2$ serves as an isolation for each of the control switches in the overall embodiment.

Figure 14:
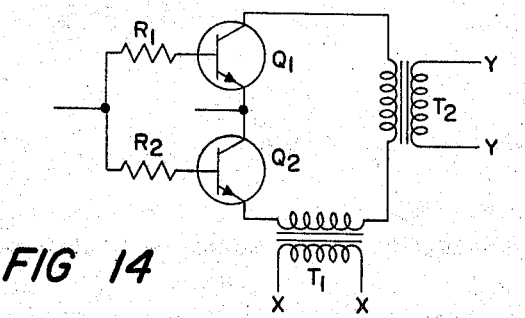
FIGURE 14 is a further schematic of switching arrangement as utilized in the present invention.

FIGURE 14 illustrates the type of output switch utilized for the switches 85, 86, 87, and 88. The transistors $Q_1$ and $Q_2$ are those of FIGURE 13. The emitter collector paths of transistors $Q_1$ and $Q_2$ are serially connected with windings of transformers $T_1$ and $T_2$. When transistors $Q_1$ and $Q_2$ are conductive, the signal applied at terminals xx of the primary windings of transformer $T_1$ will be transferred through transformer $T_2$ to output terminals yy. In the overall system to be further described, the terminals xx will be connected to one of the quadrature voltage outputs from transformers 100 and 103 such that, when the switch is turned on, the associated quadrature voltage will be passed to the output yy.

Figure 15:
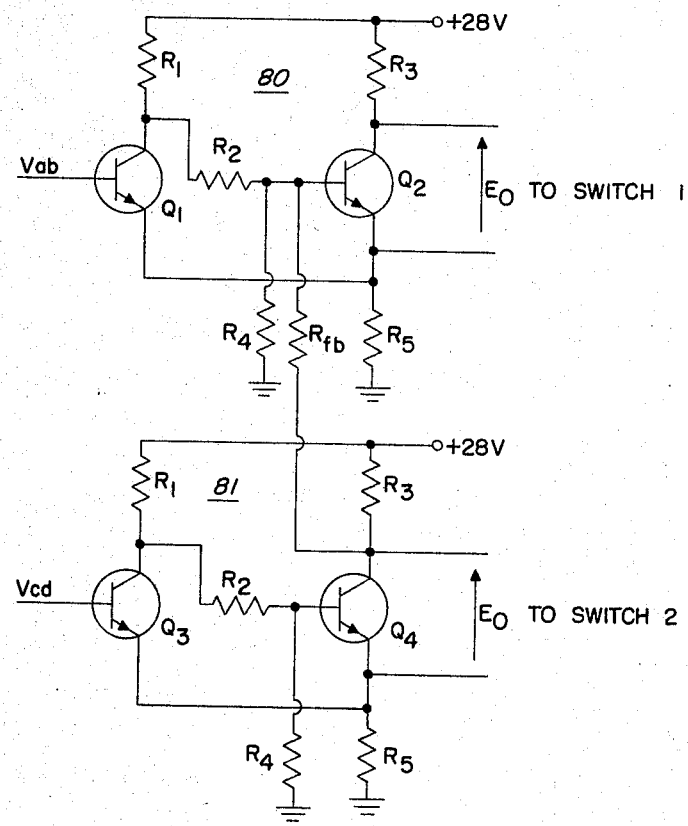
FIGURE 15 is a schematic representation of the logic circuitry as utilized in the present invention.

Previous discussion with reference to FIGURE 9 indicated an interconnecting logic between the level detector circuits 80, 81, 82 and 84 to insure that one and only one level detector would provide an output at any given period of time, and that the proper sequence of outputs was maintained. The logic was discussed as being that which insures that as one level detector fired, it would turn off the level detector that preceded it. FIG. 15 illustrates two of the Schmitt trigger level detectors of the present invention appropriately interconnected to provide this switching logic. For purposes of illustration, the uppermost Schmitt trigger circuit may be considered as being the level detector 80 monitoring the envelope of the quadrature signal $V_{ab}$. The lower Schmitt trigger circuit illustrated in FIG. 15 may be considered as the level detector 81 monitoring the envelope of quadrature signal $V_{cd}$. The base of the output transistor $Q_2$ of trigger circuit 80 is connected through a feedback resistor $R_{fb}$ to the collector of the output transistor of level detector 81. Now, assuming that trigger circuit 80 has fired, its output transistor $Q_2$ is not conducting. If trigger 81 fires, the voltage on the collector of its output transistor $Q_4$ rises to a large value, causing base current to flow into the output transistor $Q_2$ of trigger circuit 80, thus turning $Q_2$ on and causing the output $E_0$ of trigger circuit 80 to drop to almost zero. The introduction of the feedback resistor between the trigger circuits thus insures that only one of the trigger circuits may be on at any one time. In the overall embodiment, the base of the output transistor of Schmitt trigger 81 is likewise connected through a feedback resistor $R_{fb}$ to the collector of the output transistor of trigger circuit 82; trigger circuit 82 is interconnected with trigger circuit 84 in a similar manner and trigger circuit 84 is likewise interconnected with trigger circuit 80.

FIGURES 17a, 17b, and 17c constitute a complete schematic embodiment of the solid state synchro which, in accordance with this invention, provides a two-wire consistent quadrature output in response to a three-wire angular information signal such as that transmitted by a synchro angle transmitter. The schematic diagram of FIGURES 17a, 17b, and 17c corresponds to the general functional layout of FIGURE 16 wherein the functional blocks are replaced with circuitry such as described with reference to FIGURES 10, 11, 12, 13, 14 and 15.

A three-wire angular information signal such as might be transmitted from a gyro is applied to the three phase winding of transolver 40. Transolver 40, as previously discussed, develops signals $V_{ab}$ and $V_{cd}$ in secondary windings 40a and 40b, respectively. $V_{ab}$ and $V_{cd}$ are mutually 90° displaced in phase and correspond to the signals illustrated in FIGURE 5. The signal $V_{ab}$ from winding 40 is applied as input to phase detector 106 which develops outputs on lines 112 and 114 corresponding to the demodulated envelope of $V_{ab}$ as induced in transolver winding 40a and $-V_{ab}$ (180° out of phase with $V_{ab}$). Similarly, the voltage $V_{cd}$ from transolver winding 40b is applied as input to phase detector 107 to develop outputs on lines 113 and 115 corresponding to the envelope of the voltage $V_{cd}$ as induced in transolver winding 40b and the inverted or 80° out of phase envelope, $-V_{cd}$. These envelope signals, corresponding to the wave forms of FIGURE 6, are applied through identical level detection and switching channels as indicated functionally in FIGURE 9. Thus, the envelope signal $V_{ab}$ on line 112 is applied through an emitter follower 116 to a level detector 80 which develops an output when $V_{ab}$ reaches 0.707 of its maximum value which closes the associated switch 85. The envelope signal $V_{cd}$ on line 113 is applied through emitter follower 107 to level detector 81 which develops an output when $V_{cd}$ reaches 0.707 of maximum to close switch 86. The envelope signals $-V_{ab}$ on line 114 is applied through emitter follower 118 to develop an output from level detector 82 when $-V_{ab}$ reaches 0.707 of maximum to close switch 87. Lastly, the $-V_{cd}$ envelope signal on line 115 is applied through emitter follower 119 to develop an output from level detector 84 when $-V_{cd}$ reaches 0.707 of maximum to close switch 88. Because of the 90° phase relationship between these envelope signals, as illustrated in FIGURE 6 the output switches 85–88 are switched in repetitive sequence.

The output voltage is comprised of the 90° portions of each of the quadrature signals as developed by the output windings 40a and 40b of transforming means 40. This is accomplished by applying the output from winding 40a, corresponding to the modulated signal $V_{ab}$ as input to a transformer 100 which develops output signals 101 and 102 which are respectively in phase and 180° out of phase with the voltage on transolver winding 40a. Further, the modulated signal $V_{cd}$ is applied to a transformer 103 to develop output signals 104 and 105 which are respectively in phase and 180° out of phase with the signal $V_{cd}$. Thus the output windings of transformers 100 and 103 are seen to develop four signals corresponding to those in FIG. 6 of the drawings, the four signals being in the form of modulated carriers rather than the modulation envelopes which are used for level detection purposes. Now, considering the sequence of switching, as the signal $V_{ab}$ reaches 0.707 of maximum, it is necessary that the following signal $V_{cd}$ be switched to the output. The output 104 from transformer 103 (corresponding to $V_{cd}$) is accordingly applied as input to transformer 125 in the output switching circuit 85 (uppermost switch of FIGURE 17c). As $V_{ab}$ reaches 0.707 of maximum, switching circuit 85 closes and signal $V_{cd}$ is transferred to the output line 89 through output transformer 126. The level of signal $V_{cd}$ is simultaneously being sensed by level detector 81, such that when it reaches 0.707 of its maximum value, output switch 86 closes to transfer signal $-V_{ab}$ to the output 89 through output transformer 127, $-V_{ab}$ being coupled into the output circuitry associated with output switch 86 through transformer 128. The signal $-V_{ab}$ is monitored by level detector 82 so as to close switch 87 and transfer the signal $-V_{cd}$ (as applied through transformer 129) through output transformer 130 to line 89. The voltage $-V_{cd}$ is likewise monitored by level detector 84 to close output switch 88 and transfer signal $V_{ab}$ through coupling transformer 131 and output transformer 132 to the output line. The switching sequence continue with the signal $V_{ab}$ being monitored by level detector 80 to again close switch 85 to apply signal $V_{cd}$ to the output. The level detecting and switching circuitry function is thus seen to be that of monitoring one of the signals in the desired sequence and applying the desired positive-slope portion of the succeeding signal in the sequence to the output line. The signal thus developed on output line 89 from the solid state synchro is thus seen to be sequentially switched 90° segments from each of four quadrature signals developed in response to the angular information input signal. The output is thus uniform throughout a full 360°, being comprised of a series of portions each defining a like positive slope operating curve. Each of the modulated segments is of a first phase for 45° of the segment and of a reverse phase for the remaining 45° of the segment thus defining control slope operating curves directly applicable to servoing techniques. As previously noted, the output from the solid state synchro is a type of two-wire information which may be utilized by a transfluxor for a memory type control circuit. The present invention is not limited to this usage in that other usages for the two-wire quarature output as developed by the solid state synchro may be contemplated. The previously discussed heading hold operation is a particularly unique application for replacing the electromechanical embodiments presently utilized in the art. Reference may be made again to the block diagram of FIG. 2 wherein output from the solid state synchro 20 may be applied to a transfluxor analogue memory circuit from which may be developed a control signal for utilization as a steering signal for heading control of an aircraft. The details of the transfluxor memory device are defined in known applications for the transfluxor such as, for example, a memory circuit as defined by C. L. Boyajian entitled "Transfluxor Analogue Memory Circuit" as published in the report entitled "Special Technical Conference on Non-linear Magnetics and Magnetic Amplifiers" published by the American Institute of Electrical Engineers and dated September 1959. The transfluxor element 21 in conjunction with the copper feedback network 22 functions to develop a voltage $E_{out}$ which follows or is proportional to the voltage $E_{os}$ as developed from the solid state synchro 20. With switch $S_1$ closing the memory circuit loop, as illustrated in FIGURE 2, the output from transfluxor 21 follows the input $E_{os}$. When the switch $S_1$ is placed opposite that illustrated, the output from the transfluxor "remembers" the last input voltage thereto and continues to provide this voltage as a voltage $E_x$ to be combined with the output from the solid state synchro $E_{os}$. If the input signal $E_{os}$ from the synchro varies after $S_1$ has opened the memory loop, the output $E_{os}-E_x$ is applied through the second position of $S_1$ to the heading control network 13 as a control signal. The switching of switch $S_1$ for the present application occurs simultaneously with that of a second switch $S_2$, the functioning of which has previously been described as stopping the curve switching in a solid state synchro by disabling the level detectors and locking the current output segment into line 89 such that the operation of the solid state synchro remains on the control curve which existed prior to instituting the heading hold function. Accordingly, the switch $S_2$ is illustrated in the schematic diagram of FIGURE 17b in conjunction with a 28 volt D.C. source to affect this required action within the solid state synchro. The control network of FIGURE 2 then functions with switches $S_1$ and $S_2$ in a first or synchronizing position to initiate a synchronized memory function whereby the transfluxor follows the output from the solid state 20 which corresponds to the angular information provided from the gyro 10. In this synchronizing mode the solid state synchro accomplishes the aforedescribed curve switching with changing input information such that the output $E_{os}$ therefrom is the positive slope operating in curve correspondence with the angular input information. Upon selection of a heading hold mode, the switches $S_1$ and $S_2$ assume the second position wherein curve switching is held within the solid state synchro and a control or error signal is provided to the heading control network 13 as a function of any discrepancy between the $E_{os}$ output from a synchro 20 and the last remembered value of this signal as stored in the transfluxor memory circuit.

Although this invention has been described with respect to a particular embodiment thereof, it is not to be so limited as changes might be made therein which fall within the scope of the invention as defined in the appended claims.

I claim:

1. Means for converting a three-wire synchro signal defining an angular position $\theta$ between the rotor and stator elements of said synchro to a two-wire control signal defining the angle $\theta$ comprising, means converting said three-wire signal to a plurality of $m$ signals having instantaneous amplitudes respectively proportional to sine $(\theta+n\phi)$ where $n$ is an integer 0, 1, 2, 3 . . . $(m-1)$, and $\phi=360°/m$, means for demodulating each of said plurality of signals to develop therefrom envelope signals corresponding to the instantaneous amplitudes of each of said signals, signal monitoring means receiving said envelope signals, switching means receiving said plurality of signals and being responsive to and activated by said signal monitoring means to sequentially switch to a common output line predetermined portions of each of said plurality of signals in a predetermined continuous sequence.

2. Signal conversion as defined in claim 1 wherein said predetermined portions of said plurality of signals comprises like segments of said signals of $360°/m$ phase duration respectively centered about $n(360°/m)$, where $n=0, 1, 2 . . . (m-1)$.

3. Signal conversion means as defined in claim 2 wherein said signal monitoring means comprises a plurality of $m$ level detectors each connected individually to one of said plurality of envelope signals, said switching means comprising a plurality of $m$ switches connected between predetermined ones of said plurality of signals and said common output line, each of said level detectors affecting a closing of the associated said one of said switches in response to the envelope signal input thereto being in excess of a predetermined magnitude.

4. Means for converting a three-wire synchro input signal definitive of an angular position $\theta$ existing between the rotor and stator elements of a synchro transmitting means to a two-wire output signal definitive of the angle $\theta$ comprising, means for converting the input signal to a plurality of $m$ signals having modulation envelopes proportional respectively to sin $(\theta+n\phi)$ where $n=0, 1, 2, 3 . . . (m-1)$ and $\phi=360°/m$, a plurality of $m$ switching means, a common output line, each of said plurality of $m$ switching means being connected between one of said plurality of signals and said common output line, signal demodulating means receiving said plurality of signals and developing therefrom envelope signals proportional to the instantaneous amplitudes thereof; a plurality of $m$ level detecting means respectively receiving one of said envelope signals; each of said level detecting means being adapted to produce an output signal when the input thereto is in excess of a predetermined magnitude, the ouput from said level detectors respectively connected to said plurality of switching means; each of said switching means being activated in response to the output from the associated one of said level detectors to transfer the associated one of said plurality of signals to said common output line for a period corresponding to the duration of the output from the associated one of said level detectors.

5. Signal conversion means a defined in claim 4 wherein each of said level detectors produces an output and the associated one of said switching means is activated in response to the envelope signal applied to the level detector exceeding sin $(180°/m)$ of the maximum amplitude thereof, whereby sequential $360°/m$ segments of each plurality of signals are switched to said output line, each segment defining a like-positive modulation slope and said segments being respectively symmetrical about values of $\theta$ equaling $n(360°/m)$ where $n=0, 1, 2 . . . (m-1)$.

6. Signal conversion means as defined in claim 5 wherein each of said switching means is connected to and when activated, passes that one of said plurality of signals which phase-lags by $360°/m$ the envelope signal in response to which the associated level detector affects said switch activation.

7. Signal conversion means as defined in claim 6 further comprising means interconnecting each of said level detectors with that one of said level detectors monitoring envelope signal lagging $360°/m$ in phase, said interconnecting means affecting zero output from each one of said level detectors when that one of said detectors following said one detector in the switching sequence provides an output signal.

8. Signal conversion means as defined in claim 7 further comprising control switching means operatively connected to each of said level detectors and each of said switching means, a preselected position of said control switching means rendering each of said level detectors inoperative and maintaining activation of that one of said switch being activated at the time said preselected switch position is effected.

9. Signal conversion means as defined in claim 8 wherein each of said level detectors comprises a bi-level Schmitt trigger circuit including an output transistor the collector and emitter electrodes of which comprises output terminals, said interconnecting means comprising interconnecting feedback means through which the collector elements of said output transistor is connected to the base electrode of the output transistor associated with that one of said trigger circuits monitoring that one of said envelope signals which leads by $360°/m$ the associated one of said envelope signals.

10. Signal conversion means as defined in claim 4 wherein each of said plurality of switching means comprises first and second transistors, the emitter elements of said transistors being connected in common and to a first output terminal of the associated on of said trigger circuits, the base elements of said transistors being connected in common and to the other output terminal of the associated on of said trigger circuits, whereby each of said first and second transistors is forward biased in a conductive state in response to an input from the associated one of said trigger circuits, the collector elements of said transistors being connected serially with the secondary windings of an input signal transformer and the primary winding of an output transformer, the primary winding of said input transformer being connected to one of said plurality of $m$ signals, and the secondary winding of said output transformer being serially interconnected with said output line.

11. Signal conversion means as defined in claim 9 wherein said control switching means comprises a source of direct current voltage and a switch for selectively applying said direct current voltage to each of said Schmitt trigger circuits to render said trigger circuit operable while removing said source of direct current voltage from further logic means connected between the output of each of said trigger circuits and the inputs of each of the associated output switches, said further logic means comprising means responsive to the application of said source of direct current voltage to hold the activated one of said output switches at the instant of application of said direct current voltage in an activated state and further render the other ones of said switch means non-responsive to output signals from their associated trigger circuits.

12. Signal conversion means as defined in claim 11 wherein said further logic means comprises a resistor serially inserted between the common base electrodes of the output switch transistors and the associated one of said trigger circuit output terminals, a capacitor shunting said resistor, a voltage controlled rectifier, gate and cathode electrodes of said voltage controlled rectifier shunting said resistor, said source of direct current voltage being selectively switched to the anode of said voltage controlled rectifier whereby the voltage controlled rectifier associated with a conducting pair of said switching transistors is rendered conductive with the application of said direct current voltage source and maintains the conductivity of said pair of transistors.

13. Solid state synchro means for receiving a three-wire angular position defining input signal and converting said input signal to a two-wire angular information signal, comprising means converting said three-wire signal to a plurality $m$ of signals each of which lags in phase of preceding one by $360°/m$, means for monitoring the instantaneous amplitude of each of said plurality of $m$ signals, switching means connected between each of said plurality of signals and a common output line, said switch switching means being connected to and activated by said monitoring means to effect connection of said plurality $m$ of signals in predetermined sequence to said output line, the interval of application of each said plurality $m$ signals to said output line being determined by said monitoring means as those intervals during which the amplitude of that one of said plurality of signals preceding the switched one by $360°/m$ in phase is in excess of a predetermined magnitude.

14. A solid state synchronizing and control circuit for effecting angular orientation of a controlled device comprising a source of three-wire input angular information signal indicative of instantaneous angular orientation $\theta$ of the controlled device, solid state synchro means receiving said three-wire input information signal and converting said information signal to a two-wire angular information signal; said solid state synchro comprising means converting said three-wire signal to a plurality of $m$ signals having instantaneous amplitudes respectively proportional to $\sin(\theta+n\phi)$, when $n=0, 1, 2 \ldots (m-1)$ and $\phi=360°/m$, means for demodulating each of said plurality of signals to develop therefrom envelope signals corresponding to the instantaneous amplitude of each of said signals, signal monitoring means receiving said envelope signals, switching means receiving said plurality of signals and being responsive to and activated by said signal modulating means to sequentially switch to a common output line predetermined portions of each of said plurality of signals in a predetermined continuous sequence; signal mixing means receiving said common output line as a first input thereto, the output from said mixing means applied to a synchronizing and memory circuit; said synchronizing and memory circuit comprising a transfluxor element, means for setting said transfluxor at a flux level in accordance with the amplitude of the input signal thereto, negative feedback means connecting the output of said transfluxor as a second input to said mixing means, function switching means connected between said mixer and said transfluxor and to said solid state synchro, a first position of said switching means affecting interconnection between the output of said mixing means and the input to said transfluxor and enabling the aforedefined switching sequence within said solid state synchro, a second position of said function switching means connecting the output from said switching means to controlling means and controlling means being responsive to said mixing means output to affect angular orientation of said controlled device.

15. A solid state synchronizing and control circuit for effecting angular orientation of a controlled device comprising a source of three-wire input angular information signal indicative of instantaneous angular orientation of the controlled device, solid state synchro means receiving said three-wire input information signal and converting said information signal to a two-wire angular information signal; said solid state synchro comprising means converting said three-wire signal to a plurality of $m$ signals each of which lags in phase a preceding one by $360°/m$, means for monitoring the instantaneous amplitude of each of said plurality of $m$ signals, switching means connected between each of said plurality of signals and a common output line, said switching means being connected to and activated in response to said monitoring means to effect connection of said plurality of signals in predetermined sequence to said output line, the interval of application of each said plurality of signals to said output line being determined by said monitoring means as those intervals during which the amplitude of that one of said plurality of signals preceding the switched one by $360°/m$ in phase is in excess of a predetermined magnitude; signal mixing means receiving said common output line as a first input thereto, the output from said mixing means applied to a synchronizing and memory circuit; said synchronizing and memory circuit comprising a transfluxor element, means for setting said transfluxor at a flux level in accordance with the amplitude of the input signal thereon, a negative feedback means connecting the output of said transfluxor as a second input to said mixing means; function switching means connected between said mixing means and said transfluxor and to said solid state synchro, a first position of said switching means affecting interconnection between the output of said mixing means and the input to said transfluxor and enabling the signal monitoring and switching means withing said solid state synchro, a second position of said functioning switch means connecting the output from said mixing means to controlling means responsive to said mixing means output and further disabling said signal monitoring and switching means within said solid state synchro to affect angular orientation of said controlled device.

16. Means for converting a three-wire synchro signal defining an angular position $\theta$ between the rotor and stator elements of said synchro to a two-wire control signal defining the angle $\theta$ comprising, means converting said three-wire signal to first and second signals having an instantaneous amplitude proportional to $\sin \theta$ and $-\cos \theta$ respectively, means for phase converting each of said first and second signals to provide third and fourth signals having instantaneous amplitudes proportional to $-\sin \theta$ and $\cos \theta$ respectively, means for demodulating each of said first, second, third and fourth signals to develop envelope signals corresponding to the instantaneous amplitude of each of said signals, signal monitoring means receiving said envelope signals, switching means receiving said first, second, third and fourth signals and being responsive to and activated by said signal modulating means to sequentially switch to a common output line predetermined portions of each of said first, second, third and fourth signals in a predetermined continuous sequence.

References Cited by the Examiner

UNITED STATES PATENTS 3,205,492   9/1965   Young _____ 318—30

ARTHUR GAUSS, *Primary Examiner.*

R. H. EPSTEIN, *Assistant Examiner.*